(12) United States Patent
Schook

(10) Patent No.: US 8,353,411 B2
(45) Date of Patent: Jan. 15, 2013

(54) HYDROCYCLONE

(75) Inventor: Robert Schook, Ec Duiven (NL)

(73) Assignee: FMC Technologies C.V., Amsterdam (NL)

( * ) Notice: Subject to any disclaimer, the term of this patent is extended or adjusted under 35 U.S.C. 154(b) by 519 days.

(21) Appl. No.: 11/990,550

(22) PCT Filed: Aug. 16, 2006

(86) PCT No.: PCT/NL2006/000424
§ 371 (c)(1),
(2), (4) Date: May 4, 2009

(87) PCT Pub. No.: WO2007/021181
PCT Pub. Date: Feb. 22, 2007

(65) Prior Publication Data
US 2010/0006516 A1 Jan. 14, 2010

(30) Foreign Application Priority Data

Aug. 16, 2005 (NL) ..................................... 1029747

(51) Int. Cl.
*B01D 21/26* (2006.01)
*G05D 16/00* (2006.01)
*B04C 5/14* (2006.01)

(52) U.S. Cl. ....... 210/512.1; 210/97; 700/301; 209/732; 209/722; 209/725; 95/19; 55/459.1; 96/174; 96/421

(58) Field of Classification Search ............... 210/512.1, 210/512.2, 787–788, 800, 90, 97; 209/722, 209/725, 732, 733; 55/459.1; 700/301; 95/19; 96/174, 246, 253, 421, 321
See application file for complete search history.

(56) References Cited

U.S. PATENT DOCUMENTS

| 3,105,044 A | * | 9/1963 | Troland ..................... 210/512.1 |
| 3,232,430 A | | 2/1966 | Saint-Jacques |
| 3,259,246 A | * | 7/1966 | Stavenger ................... 210/195.1 |
| 3,376,977 A | * | 4/1968 | Gordon et al. ................. 210/114 |
| 4,163,719 A | * | 8/1979 | Macierewicz et al. ........ 210/787 |
| 4,426,293 A | * | 1/1984 | Mason et al. .................. 210/636 |
| 4,428,839 A | * | 1/1984 | Davies et al. ................... 95/253 |
| 5,336,410 A | * | 8/1994 | O'Brien et al. ............. 210/512.1 |
| 5,965,021 A | * | 10/1999 | Hesse et al. ................. 210/512.2 |
| 6,024,874 A | | 2/2000 | Lott |
| 6,372,019 B1 | | 4/2002 | Alferov et al. |

FOREIGN PATENT DOCUMENTS

| DE | 26 21 051 A1 | 12/1977 |
| FR | 962402 | 6/1950 |
| WO | WO 99/43439 A1 | 9/1999 |

* cited by examiner

*Primary Examiner* — Tony G Soohoo
*Assistant Examiner* — David C Mellon

(57) ABSTRACT

The present invention relates to a separating cyclone for separating a mixture of liquids into a heavy fraction, the cyclone comprising:—a cyclone tube (2) in which a flow space is defined, wherein the cyclone tube is provided with an inlet for infeed of a mixture of at least two different liquids, a heavy fraction outlet for discharging the heavy fraction separated from the mixture and a light fraction outlet for discharging the light fraction separated from the mixture;—a rotation generating unit (8) for setting into rotation the mixture fed in via the inlet;—a flow body (6) arranged substantially concentrically in the cyclone tube, in which body is provided a light fraction discharge channel (12) connected to the light fraction discharge, wherein the discharge channel has in flow direction a cross-section substantially decreasing along at least a portion of the length thereof.

22 Claims, 11 Drawing Sheets

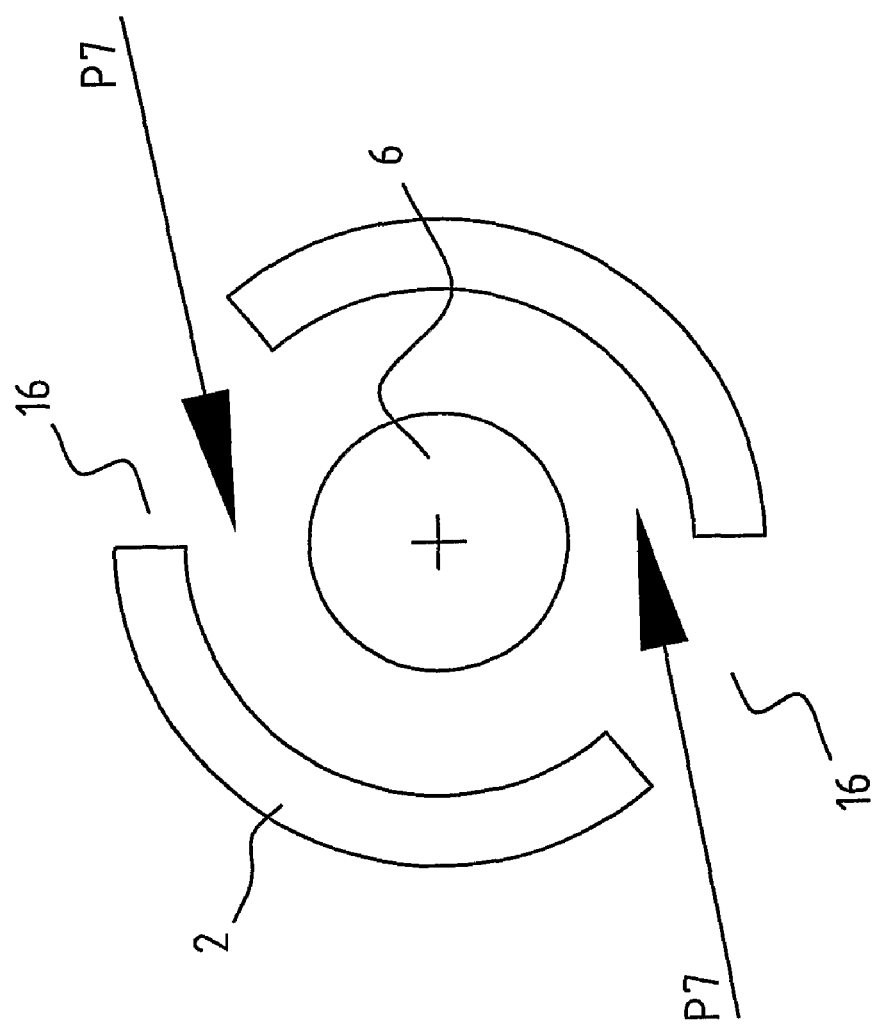

HYDROCYCLONE

BACKGROUND OF THE INVENTION

The present invention relates to a separating cyclone for separating a mixture of liquids and/or gases into a heavy fraction with one or more liquids and/or gases of a relatively high specific mass and a light fraction with one or more liquids and/or gases of a relatively low specific mass. The invention also relates to the separation of such a mixture of liquids and/or gases into a heavy fraction and a light fraction.

Such separating cyclones, also referred to as hydrocyclones, are used mainly, though not exclusively, to separate oil and water in the oil industry. The light fraction, also referred to as the light phase, is formed here by the oil, while the heavy fraction, also referred to as the heavy phase, is formed by the water. In a known type of hydrocyclone a mixture of liquids and/or gases is guided via a tangential inlet into the cyclone. As a result of the tangential inlet the incoming mixture is set into rotation. Because of the difference in density between the light fraction and heavy fraction the light phase will be displaced to a central region in the middle of the cyclone, while the heavy fraction is displaced under the influence of centrifugal forces to a peripheral region close to the inner surface of the cyclone tube. A flow body provided with a discharge channel (also referred to as "vortex finder") can be placed in the middle of the cyclone.

In a reverse flow hydrocyclone the light fraction changes direction and is discharged via said discharge channel in the direction of the light phase outflow, and subsequently discharged from the outflow. The side from which the light phase is discharged is also referred to as the overflow or reject side. The heavy phase leaves the cyclone tube on the side opposite the inlet, this side also being referred to as the underflow side. It is the desire in principle that only the light phase leaves the cyclone on the overflow side. It is the case in practice that, in order to achieve stable operation of the cyclone, an unnecessarily large quantity of heavy fraction also leaves the cyclone on the overflow side in addition to the light fraction.

In cyclones of another type (also referred to as axial flow hydrocyclones) the incoming mixture is supplied axially instead of tangentially, and the mixture is set into rotation by a swirl element. The swirl element comprises one or more stationary curved guide fins which set the mixture flowing along them into rotation. Such an axial flow hydrocyclone has the advantage that there is a lower pressure drop and a more uniformly rotating flow pattern over the cyclone, whereby a more stable interface can be realized between the light fraction and the heavy fraction. Axial flow hydrocyclones can moreover be constructed with a more limited overall length.

In both types of cyclone there are provided valves on the overflow side and the underflow side with which the pressure on each of the sides can be controlled. By adjusting the valves the position of the interface between the above-mentioned central region, in which the light fraction is situated, and the peripheral region, in which the heavy fraction is located, can be adjusted as required.

A drawback of both types of hydrocyclone is however that it has been found that, in order to be able to bring about a reasonable separation of the light fraction (usually the oil), 20 to 50 times the volume of the light fraction of heavy fraction must leave the overflow outlet. In axial cyclones the volume percentage of the light fraction relative to the heavy fraction is for instance about 2% and in tangential cyclones this proportion is about 4%. This means that the separated light fraction remains to large extent mixed with the heavy fraction, which is of course undesirable in terms of separating efficiency.

From the document U.S. Pat. No. 6,024,874 a cyclone is known which is provided with a tangential inlet for setting an incoming mixture into rotation. This brings about a separation of the mixture into a light and a heavy fraction. One fraction is discharged via a discharge channel and outlet provided in a flow body arranged centrally in the cyclone, while the other fraction is discharged via an opposite outlet. The discharge channel is provided with a channel portion with a cross-section decreasing in the flow direction. The known cyclone does not however have valves with which the pressure on the side of the light fraction discharge and on the side of the heavy fraction discharge can be adjusted, and therewith the position of the interface between the region of the light fraction and the region of the heavy fraction. The separation by the known cyclone is hereby less stable and the separating efficiency is limited.

It is an object of the present invention to provide a separating cyclone, method and assembly with which a higher separating efficiency can be achieved.

Is also an object of the present invention to provide a separating cyclone, method and assembly with which, during separation of a light phase from a mixture of liquids and/or gases, the required quantity of heavy fraction entrained with the light fraction is reduced.

It is also an object of the invention to provide a separating cyclone, method and assembly in which separation can be performed in more stable manner.

SUMMARY OF THE INVENTION

In order to achieve at least one of the stated objectives, there is provided according to a first aspect of the invention a separating cyclone for separating a mixture of liquids and/or gases into a heavy fraction with one or more liquids and/or gases of a relatively high specific mass and a light fraction with one or more liquids and/or gases of a relatively low specific mass, the cyclone comprising:

a cyclone tube in which a flow space is defined, wherein the cyclone tube is provided with an inlet for infeed of a mixture of at least two different liquids and/or gases, a heavy fraction outlet for discharging the heavy fraction separated from the mixture and a light fraction outlet for discharging the light fraction separated from the mixture;

a rotation generating unit for setting the mixture into rotation;

a flow body arranged substantially concentrically in the cyclone tube, in which body is provided a light fraction discharge channel connected to the light fraction discharge, wherein the discharge channel has in flow direction a cross-section substantially decreasing along at least a portion of the length of the discharge channel;

a first pressure control element connected to the heavy fraction outlet for adjusting the flow rate of the heavy fraction to be discharged;

a second pressure control element connected to the light fraction outlet for adjusting the flow rate of the light fraction to be discharged;

control means for controlling the first and second pressure control element;

wherein the control means are adapted to cause the interface between the heavy fraction and light fraction to make contact with the inner side of the discharge channel during use.

By providing the discharge channel for the light fraction at least partially with a cross-section decreasing in the flow direction it has been found possible to discharge more light fraction with a small quantity of entrained heavy fraction, wherein the stability of the separating cyclone is also maintained, or even improved. The device comprises a first pressure control element connected to the heavy fraction outlet and a second pressure control element connected to the light fraction outlet for the purpose of adjusting the flow rate, and thereby the pressure of respectively the heavy fraction and light fraction to be discharged. The desired flow rate, and thereby the pressures occurring on the overflow side and underflow side can be set by correct adjustment of each of the pressure control elements. The adjustment of the two pressure control elements has a direct effect on the interface between the heavy fraction in the light fraction, and thereby on the separating properties of the cyclone.

Control means are provided, for instance an electronic circuit with which two control valves provided in the respective outlets can be adjusted, for the purpose of controlling the pressure control elements such that the above stated desired differential pressure ratio can be realized.

In a preferred embodiment of the invention the said channel portion has a cross-section which decreases substantially uniformly in the flow direction, such as for instance a substantially conical form. In this embodiment it is relatively simple to position the interface between the light fraction and the heavy fraction in the flow space such that it makes contact with the inner side of the discharge channel. It has been found that if this interface makes contact with the inner side of the discharge channel, practically all heavy fraction is removed, while a minimal quantity of light fraction is still entrained into the discharge channel and discharged along this channel. This has a great positive effect on the separating efficiency of the cyclone.

According to another preferred embodiment, the said channel portion has a cross-section decreasing progressively in the flow direction.

According to another preferred embodiment, said channel portion has a cross-section decreasing degressively in the flow direction.

According to a further preferred embodiment, said channel portion is provided close to the inflow opening of the discharge channel or, more preferably, connecting onto the inflow opening of the discharge channel. This enables a simple and precise adjustment of the point of contact of the interface between the light fraction and the heavy fraction inside the discharge channel, and thereby of the separating efficiency of the cyclone.

According to a determined preferred embodiment, the rotation generating unit comprises one or more guide fins, along which the inflowing mixture can be guided. The guide fins are mounted in many cases between the inner surface of the cyclone tube and a flow element arranged centrally in the cyclone tube. Such guide fins, which form part of what is also referred to as a swirl element, set the incoming mixture into rotation, this mixture flowing preferably—though not exclusively as discussed above—axially into the cyclone via an inlet, so that downstream of the guide fins there is created an outer region, in which substantially a heavy fraction is situated, and an inner region in which substantially the light fraction is situated. Alternatively or additionally to the guide fins, the rotation generating unit can also comprise a tangential inlet element. In this embodiment the incoming mixture is fed tangentially and set into rotation. Also defined in this embodiment downstream of the rotation generating unit is the outer region in which substantially a heavy fraction is situated and an inner region in which substantially a light fraction is situated.

In a preferred type of separating cyclone, also referred to as reverse flow cyclone, the flow element which is provided substantially concentrically in the flow space and in which the rotation generating unit is provided is integrated with the above-mentioned flow body in which the discharge channel is provided. Once the liquid (or the gas) has been set into rotation by the rotation generating unit of the flow element, the light fraction is discharged by the same flow element (flow body). The light fraction is therefore fed back while the heavy fraction continues on its way. An advantage of this embodiment is that the cyclone can be given an extremely compact form.

According to another preferred embodiment however, the flow element on which the guide fins are provided and the flow body in which the discharge channel is provided are embodied individually, wherein the flow body is disposed downstream some distance from the flow element. Such a cyclone is also referred to as axial flow cyclone. In this embodiment both the heavy fraction and the light fraction are discharged axially and substantially without reversing the direction of movement, wherein the latter fraction is discharged via the discharge channel provided downstream in the flow body. In this embodiment a passage can preferably be defined between the inner side of the cyclone and the outer side of the flow body, this passage being connected to the heavy fraction outlet. This passage enables discharge of the heavy fraction without the transporting direction of the heavy fraction here having to be adjusted.

In a further preferred embodiment rotation reducing units can be provided in said passage for reducing the rotation of the heavy fraction flowing therealong, which brings about a reduction in the pressure drop over the cyclone. Such a recovery of pressure is in many cases not necessary, and the rotation reducing unit can be dispensed with.

According to a further preferred embodiment, there are provided in the discharge channel for discharging a light fraction one or more rotation reducing units for reducing rotation of the light fraction flowing therealong. Such a recovery of pressure is not necessary in many cases, and the rotation reducing units can be dispensed with.

According to a further preferred embodiment, the separating cyclone comprises an elongate element, preferably a rod, arranged between the first and second flow body and extending concentrically relative to the discharge channel for the purpose of stabilizing the rotating light fraction. Stabilizing of the light fraction flow results in a less irregular interface between the light fraction and heavy fraction, so that the above-mentioned interface contact point in the discharge channel can be more readily adjusted. This has the result that a better separation can be realized with a reduced amount of entrained heavy fraction.

According to a further preferred embodiment, the elongate element extends into the discharge channel and preferably to a position beyond said channel portion, this further enhancing the stability of the cyclone, particularly in gas-liquid situations.

According to a further preferred embodiment, the discharge channel extends through the flow body and through at least one of the guide fins provided on the flow body, so that an extremely compact cyclone can be obtained.

In another preferred embodiment the cyclone comprises two successively coupled separating cyclones, wherein the separated heavy fraction from the first separating cyclone is carried into the second separating cyclone for the purpose of further separation into a heavy and a light fraction. The second cyclone is here preferably of the type in which the discharge channel is arranged through a guide fin in order to enable discharge of the light fraction.

According to another aspect of the invention, a method is provided for separating a mixture of liquids and/or gases into a heavy fraction with one or more liquids and/or gases of a relatively high specific mass and a light fraction with one or more liquids and/or gases of a relatively low specific mass, the method comprising of:

- guiding the mixture to be separated via an inlet through a flow space defined in a cyclone tube;
- generating rotation of the mixture flowing through the flow space for the purpose of separating the mixture into the heavy fraction and light fraction;
- guiding the heavy fraction to a heavy fraction outlet;
- guiding the light fraction through a discharge channel in a flow body arranged substantially concentrically in the cyclone tube such that the interface between the heavy fraction and light fraction makes contact with the inner side of the light fraction discharge channel.

When the discharge channel of the cyclone has a cross-section substantially decreasing in flow direction over at least a portion of the length of the discharge channel, the step of guiding the light fraction through the discharge channel preferably comprises of guiding thereof such that said interface makes contact with the inner side of said portion of the discharge channel.

A separating cyclone of the type described herein is preferably applied in the method defined herein.

Finally, there is provided according to a further aspect of the invention an assembly comprising a separating vessel provided with separating walls for subdividing the inner space of the separating vessel into an inlet compartment, a heavy fraction compartment and a light fraction compartment, wherein the separating vessel is provided with an inlet element for supply of the mixture to be separated to the inlet compartment, a light fraction outlet element for the discharge of light fraction from the light fraction compartment, and a heavy fraction outlet element for the discharge of heavy fraction from the heavy fraction compartment, wherein a number of separating cyclones of the type described herein according to the invention arranged on both separating walls are provided in the separating vessel, and wherein each of the separating cyclones is arranged with its inlet in the inlet compartment, with its light fraction outlet in the light fraction compartment and with its heavy fraction outlet in the heavy fraction compartment.

It has further been found that an exceptionally good separating result can be achieved when a mixture to be separated is guided first through a cyclone of the axial flow type and subsequently through a cyclone of the reverse flow type. According to another aspect of the invention, there is therefore provided a separating cyclone for separating a mixture of liquids and/or gases into a heavy fraction with one or more liquids and/or gases of a relatively high specific mass and a light fraction with one or more liquids and/or gases of a relatively low specific mass, the cyclone comprising:

- a cyclone tube in which a flow space is defined, wherein the cyclone tube is provided with an inlet for infeed of a mixture of at least two different liquids and/or gases, a heavy fraction outlet for discharging the heavy fraction separated from the mixture, a first light fraction outlet for discharging a first part of the light fraction separated from the mixture and a second light fraction outlet for discharging a second part of the light fraction separated from the mixture;
- a first flow element provided with one or more guide fins for setting the incoming mixture into rotation;
- a first flow body which is arranged substantially concentrically in the cyclone tube and in which is provided a light fraction discharge channel connected to the first light fraction outlet;
- a second flow body which is provided with one or more guide fins and arranged substantially concentrically in the cyclone tube and along which the heavy fraction is guided, wherein a discharge channel is provided in the second flow body and in at least one of the guide fins for discharging the light fraction separated from the supplied heavy fraction to the second light fraction outlet.

An exceptionally good separating result can be obtained with this separating device. Construction of the device can moreover be quite compact because the discharge channel for the second light fraction is arranged in the flow body and subsequently in the guide fins themselves.

The discharge channels in the flow element and/or the flow body are preferably of the type described herein with a cross-section substantially decreasing over at least a portion of the length of the discharge channel. This is not essential however. Good separating results can also be obtained with a separating device provided with one or more "straight" discharge channels.

According to a preferred embodiment the inflow mouth of the first light fraction discharge channel is positioned upstream of the first flow body, and the inflow mouth of the second light fraction discharge channel is positioned downstream of the second flow body, so that an improved separating efficiency is provided with a compact structure of the cyclone.

Further advantages, features and details of the invention will be elucidated on the basis of the following description of a number of preferred embodiments thereof.

BRIEF DESCRIPTION OF THE DRAWINGS

Reference is made in the description to the figures, in which:

FIG. 5 shows a cross-section of the second embodiment;

DETAILED DESCRIPTION OF THE INVENTION

In a hydrocyclone of the tangential or axial type the mixture entering the cyclone space is set into rotation respectively by a tangential inlet element and a swirl element. Because of the difference in density between the light phase, i.e. for instance the oil, and the heavy phase, i.e. in this example the water, the oil is transported to the centre of the cyclone.

Figure 1:
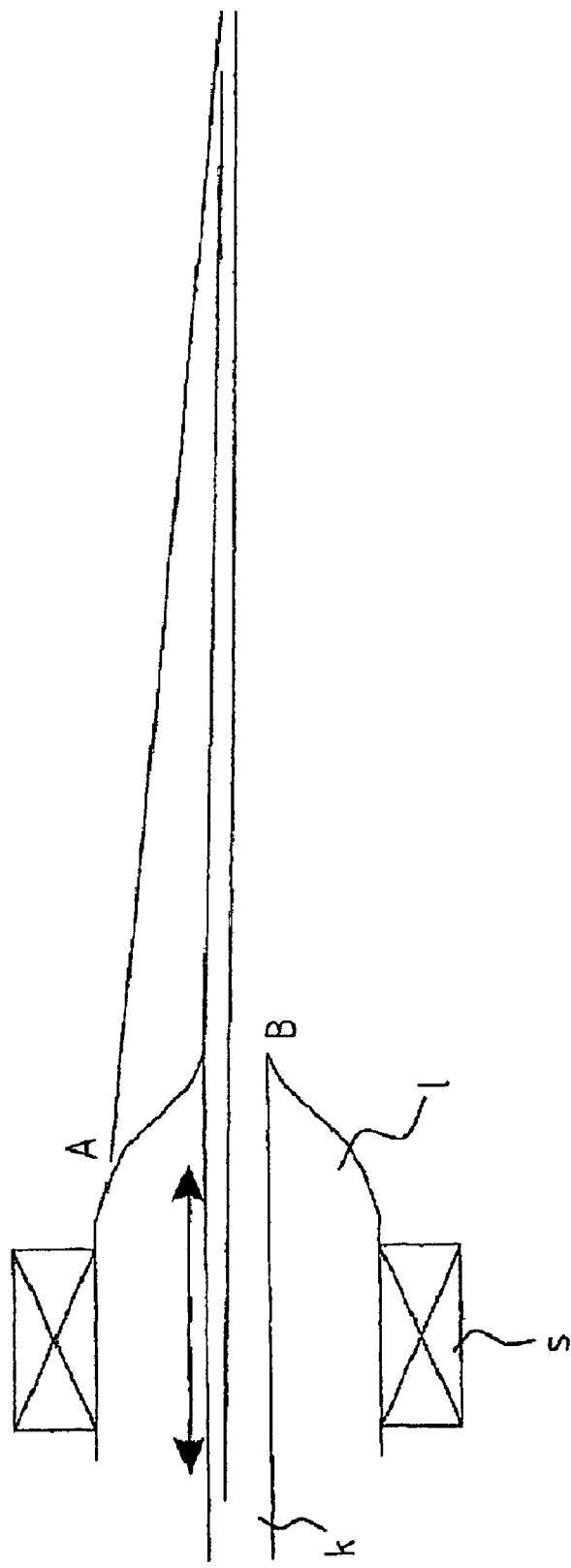
FIG. 1 shows a longitudinal section of a known hydrocyclone.

FIG. 1 shows an example of a prior art reverse flow hydrocyclone, in which the rotating core of the light fraction, i.e. the oil layer, is discharged via the discharge channel in the flow body, while the rotating mixture in the outer region of the cyclone, i.e. the water, is discharged via the water outlet. In a hydrocyclone of the reverse flow type the oil is discharged together with an unnecessarily large quantity of water in the direction of the overflow outlet, while the clean water is carried in the opposite direction to the underflow outlet. In the flow space in the cyclone there is therefore present a water/oil interface in which the oil and the water have opposing directions.

FIG. 1 shows three situations with differing oil/water interface positions. In the first situation (A) the region in which the oil is substantially located is bounded by an interface which makes contact with the outer side of the flow body of the cyclone. In this situation only a part of the oil is discharged via the discharge channel in the flow body, while the rest enters the water outlet. The water outlet is therefore contaminated with a quantity of oil, which is undesirable. In the second situation (B) interface 2 extends in lengthwise direction of the discharge channel and does not therefore make contact with the flow body. While in this situation all oil is discharged from the oil outlet discharge, the oil outlet still also comprises a large quantity of water, this reducing the separating efficiency of the cyclone. It has been found in practice to be difficult, if not impossible, to adjust the interface precisely such that only oil is discharged via the discharge channel while only a minimal amount of oil enters the water outlet.

It has moreover been found that instabilities occur as a consequence of the so-called Kelvin-Helmholz phenomenon. If a moving layer of two different types of liquid is present, this layer can become unstable because of, among other factors, differences in velocity and density between the two layers. If these differences are too great, droplets of the one liquid can enter the flow of the other liquid, whereby the stability of the interface is to a large extent lost. For a hydrocyclone this means that parts of the already separated oil enter the water and leave the cyclone from the water outlet (on the underflow side). This means in practice a reduction in the separating efficiency of the cyclone. Because in the above stated known hydrocyclone a large quantity of water is entrained to the oil outlet in addition to the oil in the second situation (B), relatively high speeds occur in the flow space of the cyclone as a result of the large volume flow, whereby a large difference in speed can occur between the overflow and underflow. This causes the above-mentioned Kelvin Helmholz instabilities, resulting in unstable separating behaviour of the cyclone.

Figure 2:
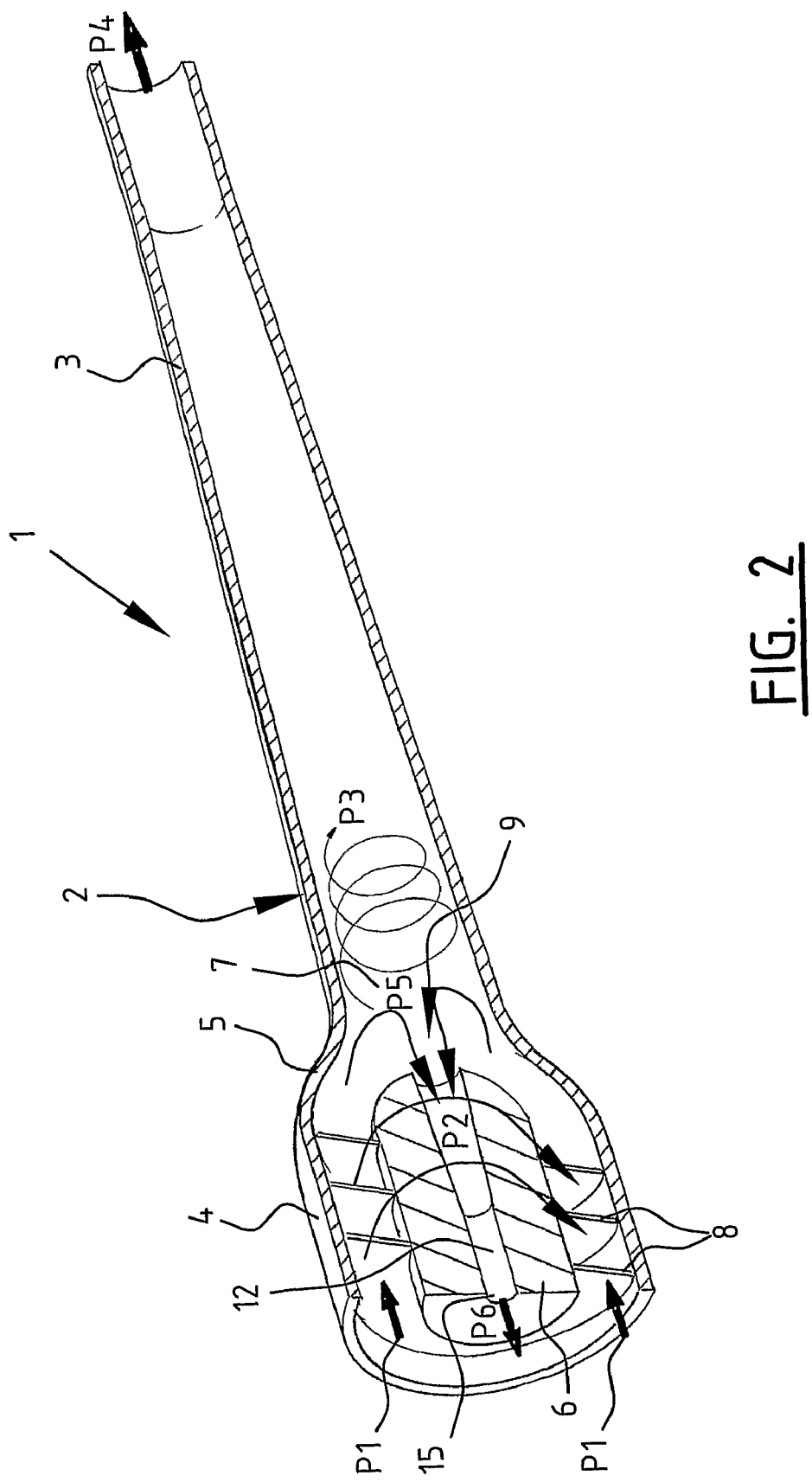
FIG. 2 shows a perspective view, cut away in longitudinal direction, of a first embodiment of the present invention.
Figure 3:
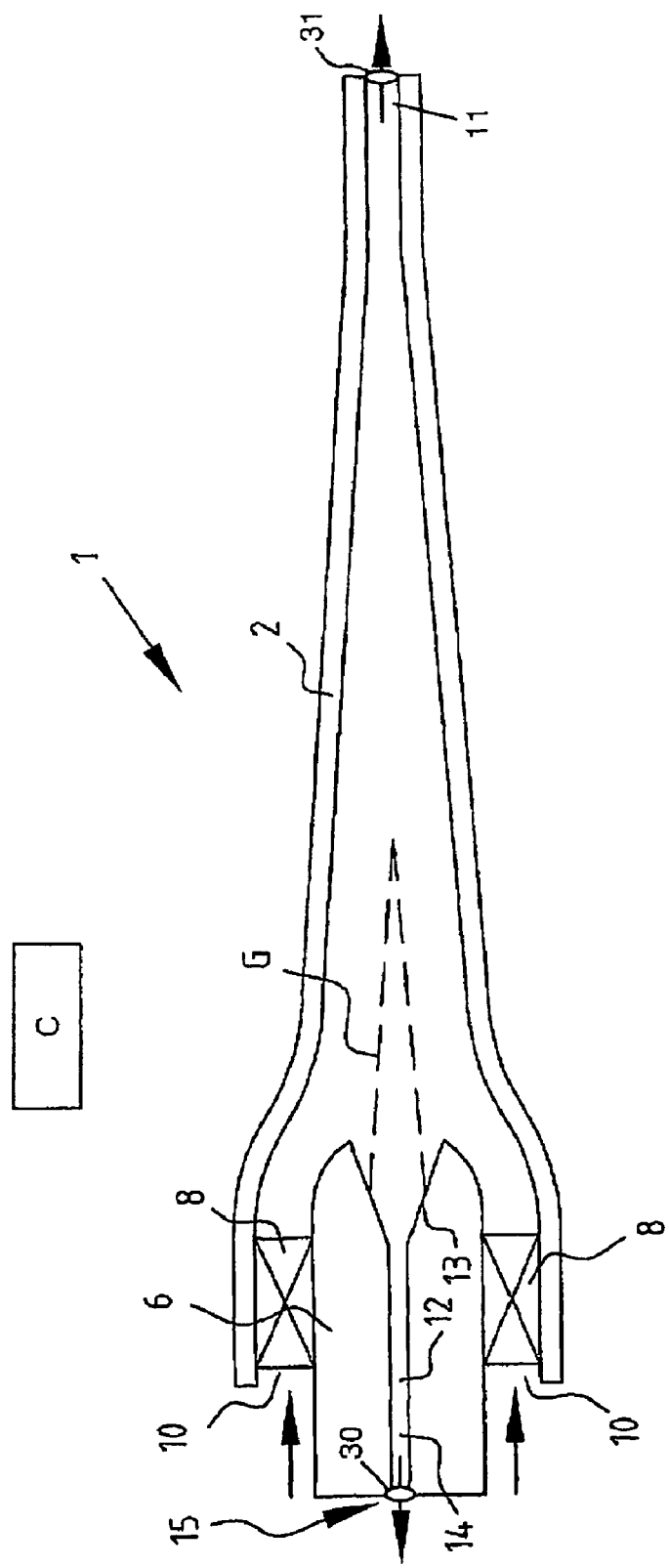
FIG. 3 shows a longitudinal section of the first embodiment.

FIGS. 2 and 3 show a first preferred embodiment of a cyclone 1 according to the invention. Cyclone 1 comprises a cyclone tube 2 which is constructed in the shown embodiment from a relatively narrow cyclone tube part 3 with a cross-section decreasing toward the right outer end, a relatively wide cyclone tube part 4 and an intermediate part 5 between cyclone tube part 4 and cyclone tube part 3. A flow element 6 is arranged in the inner space 7 enclosed by the wide cyclone tube part 4. In the shown embodiment the flow element has a round cross-section, although this does not always have to be the case. A guide fin 8 or a plurality of guide fins is arranged on the flow element and on the inner side of cyclone tube part 4. Guide fin 8 consists of a plate which is curved such that the liquid mixture ($P_1$) to be separated entering via inlet 10 is guided along guide fins 8 and is thereby set into rotation ($P_2$). As a result of the rotation the relatively heavy liquids, in an example of an oil-water separator the water, will be directed under the influence of the centrifugal forces toward an outer region adjoining the inner side of cyclone tube 2, while the relatively light liquids, in said example the oil, will be directed substantially in the centre of the cyclone tube. The interface (G) between the oil and the water is shown in FIG. 3. Provided at the position of water outlet 11 or downstream thereof and at the position of oil outlet 15 or downstream thereof are respective pressure control units 30, 31 with which the local speed and therefore pressure of the underflow and the overflow respectively can be adjusted by control means C. The pressure control units thereby also provide for the positioning of the oil-water interface.

Via the discharge channel 12 provided in flow body 6 the oil is transported from inlet opening 9 to outlet opening 15 ($P_5$, $P_6$). The heavy fraction located in the outer region on the inner side of cyclone tube 2 is guided while already rotating ($P_3$) in the direction of the heavy phase outlet 11, and discharged from outlet 11 ($P_4$).

As shown in FIGS. 2 and 3, discharge channel 12 in flow body 6 for discharging the light fraction is provided with a substantially straight portion 14 and a substantially conical portion 13. The conical portion 13 extends from infeed opening 9 of the discharge channel and has a diameter decreasing in the flow direction ($P_6$). As a result the position of the interface (G) between the light fraction and the heavy fraction can be adjusted in a simple manner by operating the above-mentioned pressure control units so that the interface makes contact with discharge channel 12 in said conical portion 13. Due to the conical form there is a greatly reduced risk that the interface will run parallel to discharge channel 12 and therefore not make contact with the inner side thereof, so that a heavy fraction (water) would be entrained with the light fraction (oil). Because the interface can be adjusted in a simple and efficient manner such that it makes contact with the discharge channel 12 at a random point, light fraction (for instance oil) is prevented from entering underflow outlet 11 or heavy fraction (for instance water) is prevented from entering overflow outlet 15 in substantial quantities.

Figure 4:
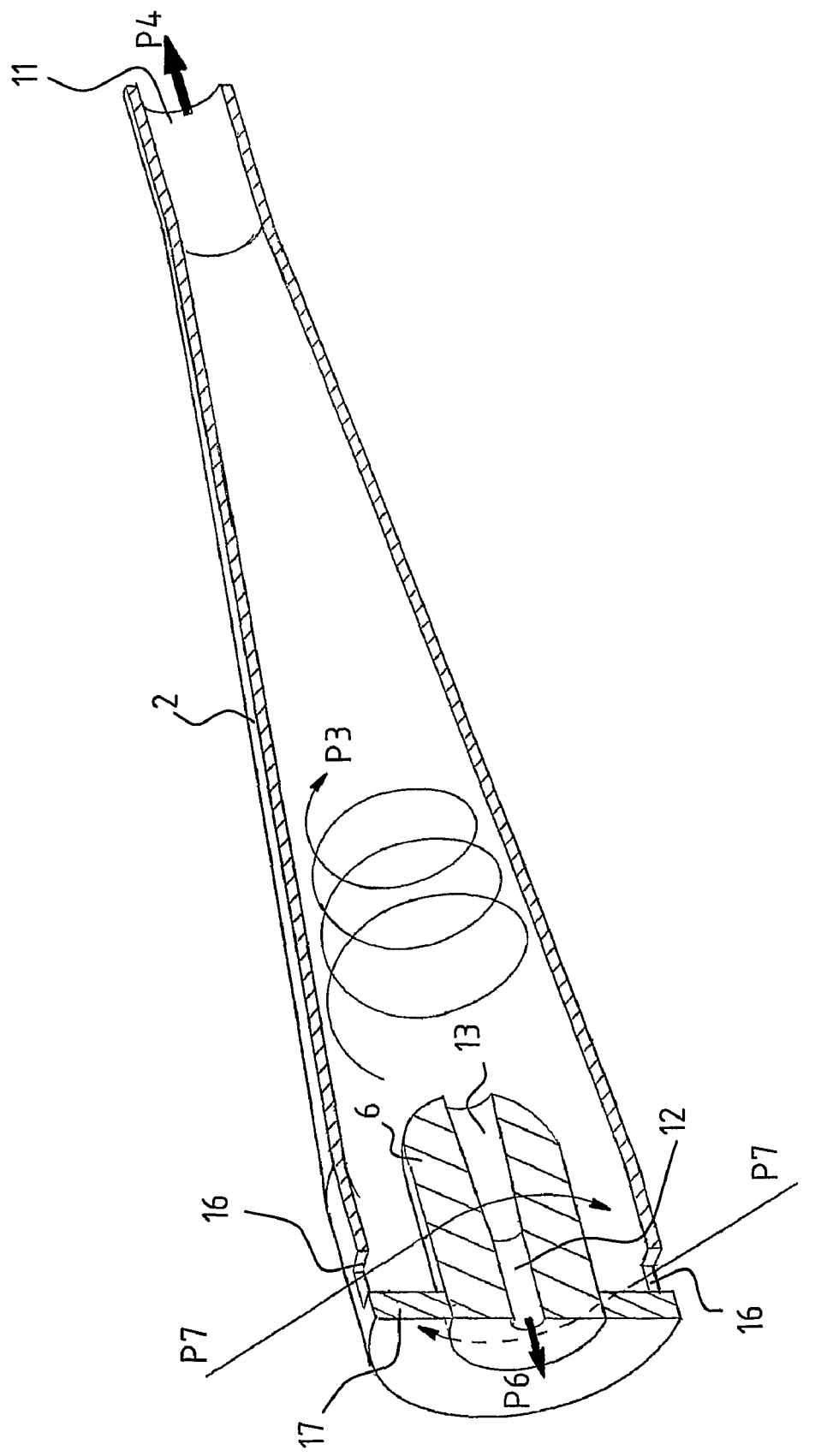
FIG. 4 shows a perspective view, cut away in longitudinal direction, of a second embodiment of the present invention.

FIGS. 4 and 5 show a second preferred embodiment of the invention. In these figures the same reference numerals designate the same or similar components as those of the first embodiment. Instead of axial feed via an inlet 10 of the mixture to be separated and subsequent setting into rotation of the inflowing mixture by guiding thereof along one or more stationary guide fins 8, the incoming mixture is introduced ($P_7$) via one or more tangential inlets 16 into the cyclone tube closed at one end with end wall 17. In combination with the curved inner surface of cyclone tube 2, inlet openings 16 form a tangential inlet element with which the incoming liquid mixture is set into rotation. Once the liquid mixture has been set into rotation, a process occurs similar to that described above. The relatively heavy fraction (for instance the water) of the mixture is driven into the outer region close to the inner side of cyclone tube 2, while the relatively light fraction (the oil) of the mixture comes to lie in a central region. Due to the conical portion of the discharge channel it is also easier in this embodiment, using the above mentioned pressure control units, to have the interface (G) between the heavy fraction and the light fraction make contact with the inner surface of conical portion 13 of discharge channel 12, so that not only is all light fraction discharged from the light fraction outlet 15, but no heavy fraction, or hardly any, is discharged via this same light fraction outlet 15.

Figures 6A, 6B:
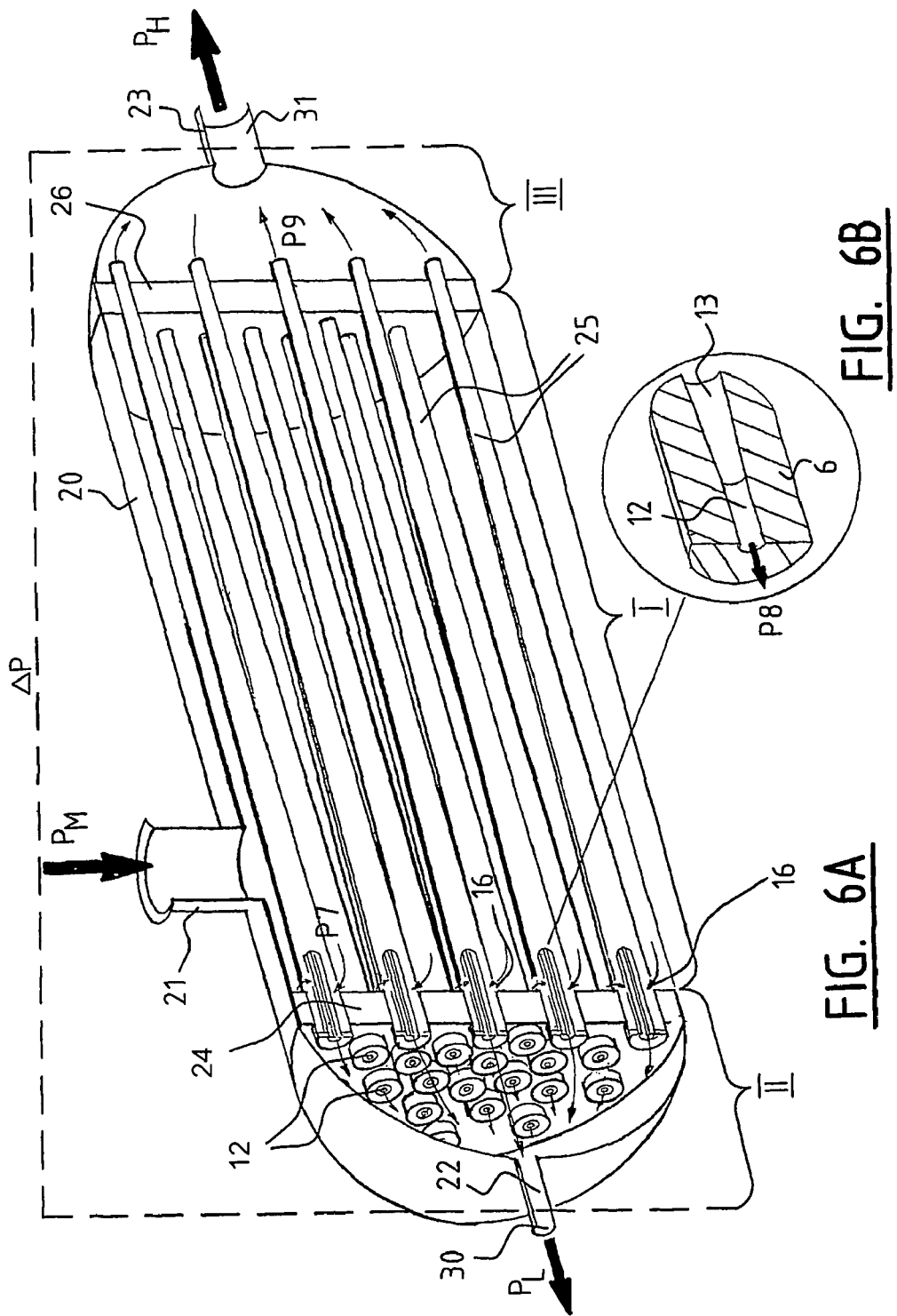
FIG. 6A shows a perspective view, cut away in longitudinal direction, of a preferred embodiment of an assembly according to the invention.
FIG. 6B is an enlarged detail of one of the separating cyclones of the assembly shown in FIG. 5.

In FIGS. 6A and 6B is shown a third preferred embodiment of the invention. In this embodiment a number of substantially parallel cyclones 25 of the type described herein are arranged in a separating vessel 20 disposed horizontally (or obliquely or vertically). Separating vessel 20 is provided with a first connecting stub 21 via which the mixture to be separated can be supplied ($P_M$). Separating vessel 20 is also provided with a light fraction outlet stub 22, along which the light fraction can be discharged ($P_L$). Finally, a heavy fraction discharge stub 23 is provided on the right-hand side of separating vessel 20 for discharge ($P_H$) of the heavy fraction. Connecting stubs 22, 23 are provided with respective pressure control units 30, 31 with which the flow rate (volume per unit time) of the mixture flowing therealong can be adjusted. A pressure control unit 30,31 consists for instance of an adjustable valve which is placed in a conduit and whereby more or less liquid can flow per unit time through the relevant conduit subject to the position of the valve. The flow divided between overflow outlet 22 and underflow outlet 23 can be adjusted as required by setting each of the control units 30,31, for instance such that a specific differential pressure ratio (DPR) can be brought about.

Three compartments can be distinguished in vessel 20, in that cyclones 25 are arranged in a first separating wall 24 and a second separating wall 26. An inlet compartment (I) is defined between the first separating wall 24 and the second separating wall 26, while a heavy fraction outlet compartment (III) is defined on the right-hand side of the second separating wall 26, and a light fraction outlet compartment (II) is defined on the left-hand side of first separating wall 24. Cyclones 25 extend beyond separating walls 24, 26, so that the liquids entering via inlet 21 can only reach the two outlet compartments II, III via one or more of the cyclones 25. In the shown embodiment cyclones 25 are embodied in the form of the embodiment which is shown in FIGS. 4 and 5 and which is provided with a tangential inlet and with a conical portion 13 of discharge channel 12, as shown in more detail in the enlargement of FIG. 6B. The mixture to be separated coming in via inlet 21 enters cyclones 25 ($P_7$) via each of the tangential inlet openings 16, whereafter a separation takes place in the above described manner between the heavy fraction and the light fraction. The light fraction is discharged via discharge channel 12 and enters the light fraction outflow compartment II. The heavy fraction continues on its way in the direction of the second separating wall 26 and eventually enters ($P_9$) the heavy fraction outlet compartment III. In the shown embodiment it is possible to suffice with a single pressure control unit 30 for overflow outlet 22 and a single pressure control unit 31 for the underflow outlet 23. In other embodiments as described above and as will be described hereinbelow, each of the separating cyclones can be provided with its own overflow control unit.

Figure 7:
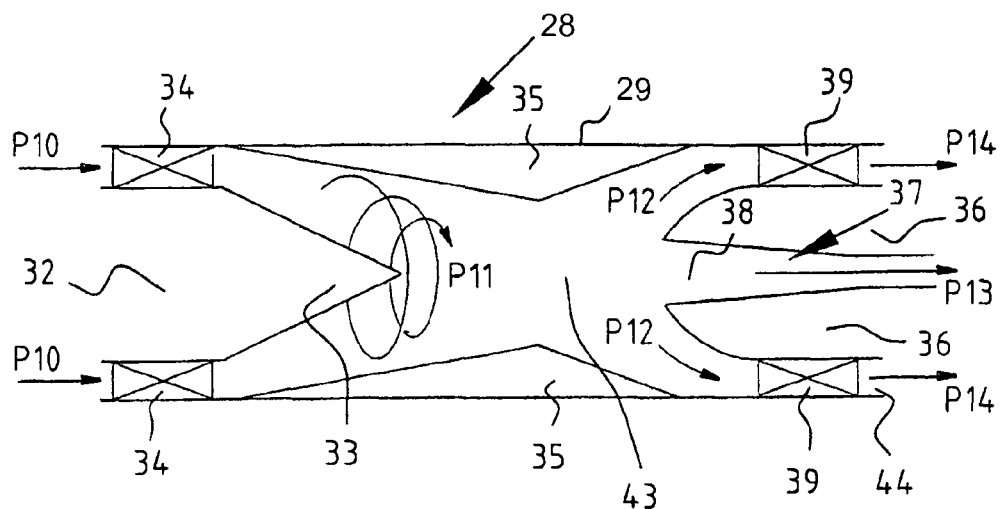
FIG. 7 shows a longitudinal section of a fourth preferred embodiment of the invention.

FIG. 7 shows a third preferred embodiment of the invention. In the cyclone 28 of this preferred embodiment, a mixture to be separated is supplied to a cyclone tube 29 in an axial manner ($P_{10}$) and set into rotation by means of one or more swirl elements 34 provided on a flow element 32. The mixture set into rotation ($P_{11}$) enters a flow space 43. Flow space 43 forms a channel of a random form, for instance cylindrical, diverging, converging or a combination of diverging and converging. In the shown embodiment a first converging then diverging form is provided by arranging a further flow element 35 in cyclone tube 29. Under the influence of the rotation of the supplied mixture the heavy fraction is flung outward and comes to lie in the outer region close to the inner walls of cyclone tube 29. The heavy fraction is discharged ($P_{12}$) via an annular discharge channel 44 in the direction of the heavy fraction outlet. In the shown embodiment one or more anti-swirl elements 39, preferably comprising one or more guide fins, are arranged in discharge channel 44. These guide fins have a curvature decreasing in the flow direction in a manner such that the degree of rotation of the mixture flowing therealong is reduced in order to recover some measure of pressure. The light fraction, which in the above described embodiments changed direction and was discharged via a discharge channel in the flow body, is discharged according to this embodiment without reversing the direction of transport. The light fraction enters a light fraction discharge channel 37 of a flow body 36 arranged centrally in cyclone tube 29. Discharge tube 37 is provided with a conical portion 38 so that, in a similar manner as described above, the interface between the heavy fraction and the light fraction can make contact with the inner surface of conical portion 38 such that all, or practically all, light fraction is discharged, while no heavy fraction, or hardly any, is entrained and discharged ($P_{13}$) via the light fraction discharge channel 37.

Figure 8:
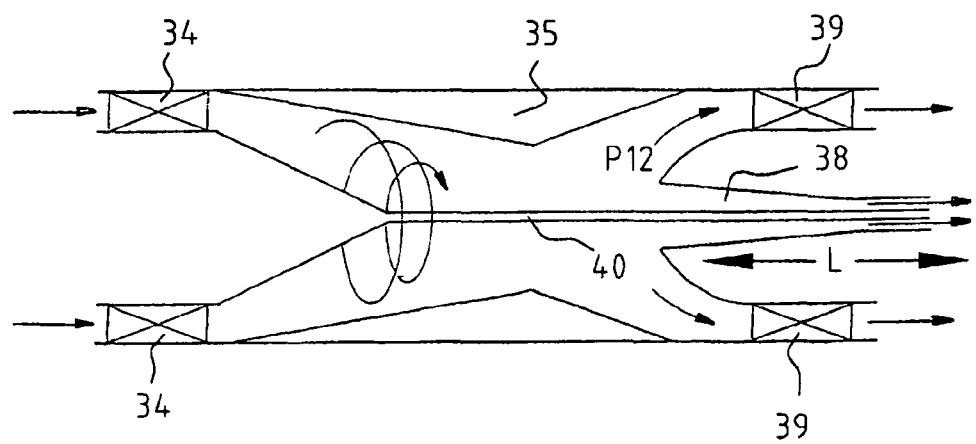
FIG. 8 shows a longitudinal section of a fifth preferred embodiment of the invention.

FIG. 8 shows a further preferred embodiment which is largely similar to the embodiment shown in figure 7. A further explanation of the operation of this embodiment is therefore omitted here to the extent it is identical to that of the embodiment of figure 7. In the embodiment shown in FIG. 8 a central rod 40 is fixed to the conical outer end 33 of flow element 32. In the shown embodiment the rod extends parallel to the cyclone tube and to the discharge channel 37 provided in flow body 36. By arranging rod 40 centrally in the cyclone tube the rotating movement of the light fraction in the direction of discharge channel 37 becomes more stable, thus enhancing the separating efficiency of the cyclone.

In the shown embodiment, the rod 40 is arranged through a distance L (FIG. 8), the distance L being such that the outer end of the rod protrudes into the discharge channel beyond the region in which the conical portion of the discharge channel is situated. In another embodiment (not shown) central rod 40 extends less far, for instance only to a position before the inlet opening 9 of discharge channel 37. In both situations the central rod 40 provides for a more stable transport of the light phase in the direction of and through discharge channel 37.

In the above described preferred embodiments of the invention the discharge channel of the light fraction is embodied with a cross-section decreasing in the flow direction (for instance $P_6$) in that the discharge channel 12 is provided with a conical portion 13. The portion of the discharge channel in which the cross-section decreases does not however have to be cone-shaped, nor does it have to bring about a constant decrease in the cross-section.

Figure 9:
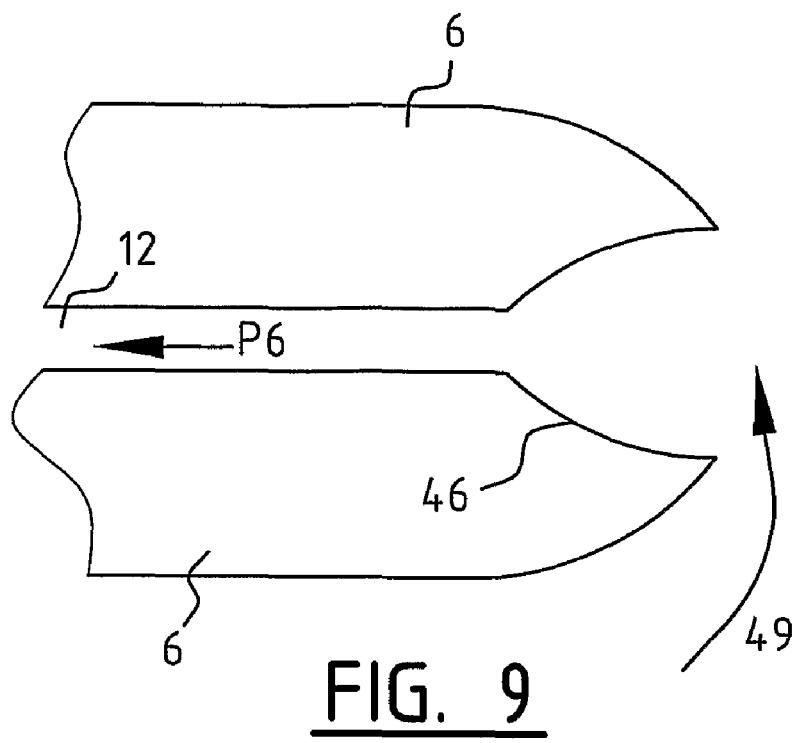
FIG. 9 shows a longitudinal section of a flow body provided with a discharge channel according to a further preferred embodiment of the invention.

In FIG. 9 is shown for instance an embodiment in which the curved portion 46 of discharge channel 12 has an increasing curvature from the inflow mouth 49 of discharge channel 12. The advantages of the invention can also be realized in this embodiment.

Figure 10:
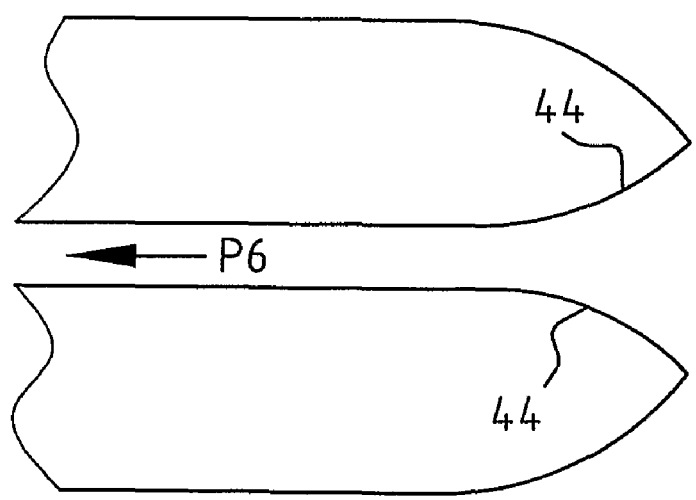
FIG. 10 is a longitudinal section of a flow body provided with a discharge channel according to yet another preferred embodiment of the invention.

FIG. 10 shows another preferred embodiment in which the portion 44 of discharge channel 12 has a curvature which decreases in the direction of transport ($P_6$). The advantages of the invention can also be realized in this embodiment.

Figure 11:
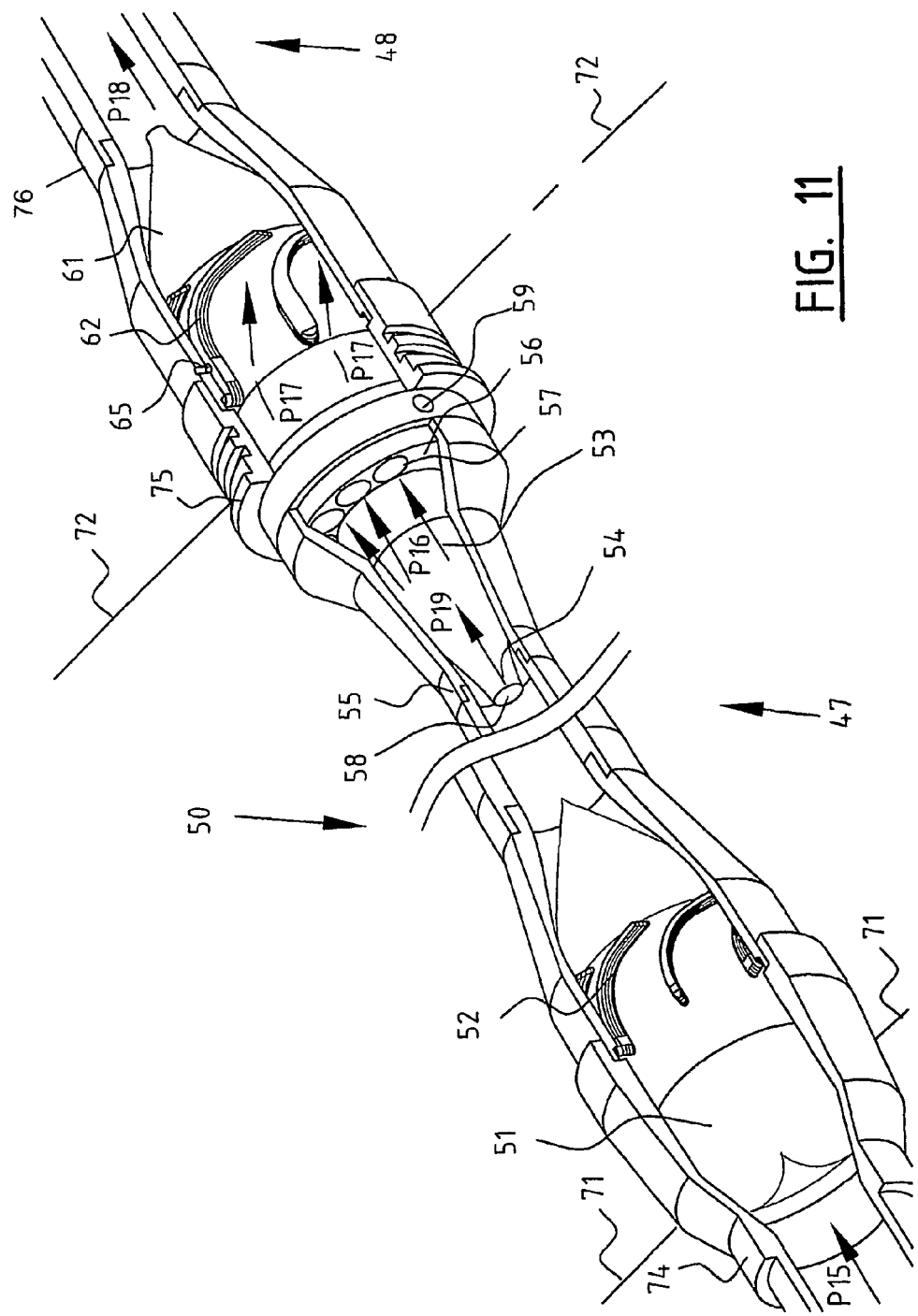
FIGS. 11 and 12 show partially cut-away views in perspective of a further preferred embodiment of the invention.
Figure 12:
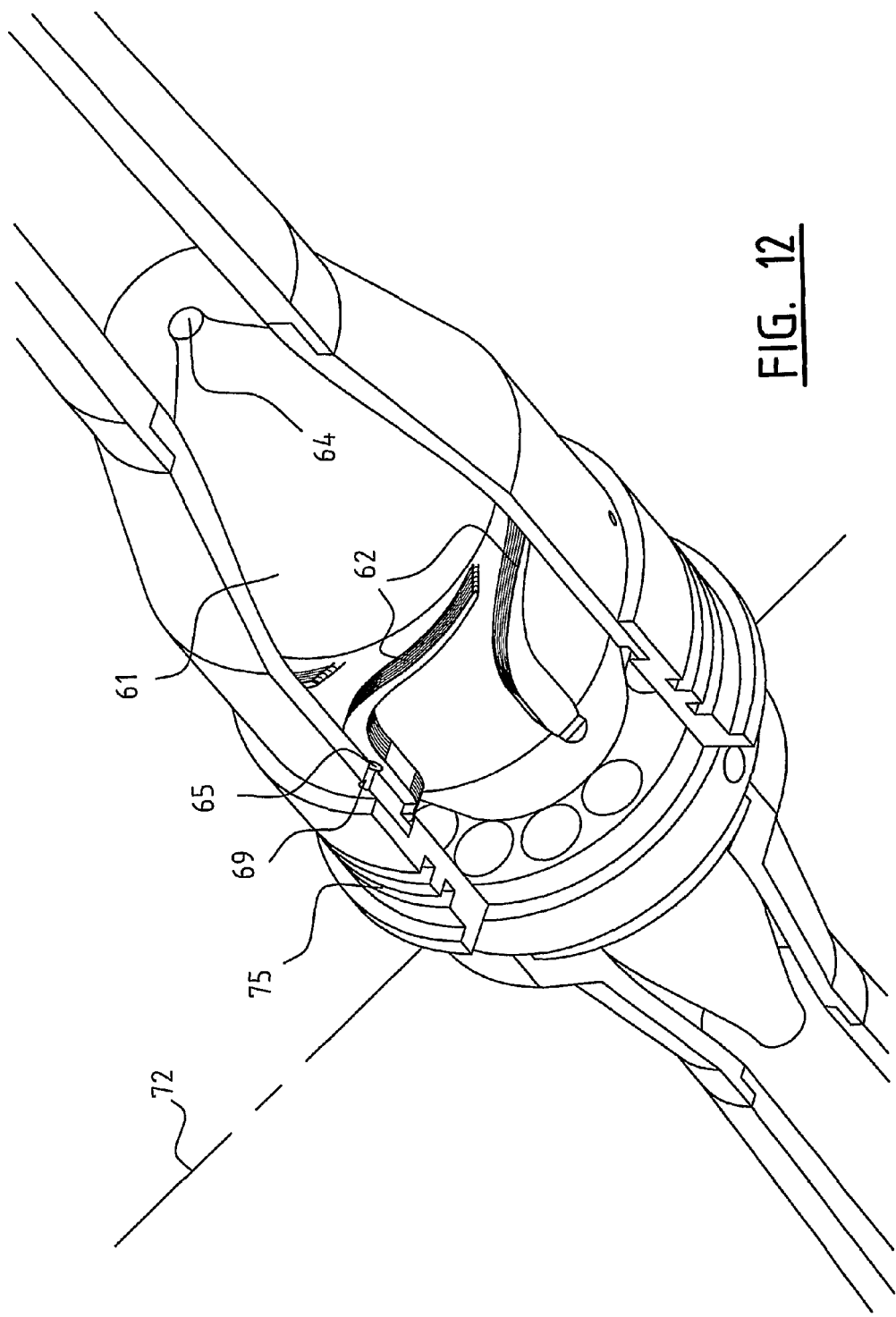

FIGS. 11 and 12 show a further preferred embodiment of the invention. In this embodiment two axial cyclones are placed successively so that separation takes place in two stages. In a first stage of the two-stage cyclone 50 a first cyclone 47 of the axial flow type provides for a first separation of the supplied mixture, while in a second stage a second cyclone 48 of the reverse flow type brings about a further separation of the mixture. The mixture flows into the first cyclone 47 ($P_{15}$) and, in similar manner as described with reference to the embodiment shown in FIG. 7, set into rotation via guide fins 52 arranged on a flow element 51.

The first cyclone 47 is of the axial flow type, which means that the rotating light fraction is discharged via a discharge channel 54 provided in a flow body 53 provided downstream of flow element 51. The heavy fraction is discharged via a flow space between outer casing 55 of the cyclone and the flow body 53. Flow body 53 is coupled to outer casing 55 of the cyclone using an upright flange 56. Provided in flange 56 are circular openings 57 along which the supplied heavy fraction can be guided ($P_{16}$) in the direction of second cyclone 48. As stated above, the light fraction is discharged ($P_{19}$) via discharge channel 54, of which the inflow mouth 58 and the outflow opening 59 are shown. Discharge channel 54 is therefore formed such that the light fraction is internally deflected and can leave the cyclone laterally via outflow opening 59.

The heavy fraction flowing away via openings 57 enters the flow space of second cyclone 48 ($P_{17}$). Second cyclone 48 is of the reverse flow type, wherein the flow direction of the light fraction is reversed in similar manner as is the case in the embodiment shown in FIG. 2. Cyclone 48 comprises an integrated flow body/flow element 61 on which guide fins 62 are arranged and in which a discharge channel 64 is provided. These guide fins set the heavy fraction from first cyclone 47 into rotation, whereby the supplied heavy fraction is once again separated into a relatively light and a relatively heavy fraction. As already stated above, second cyclone 48 is of the reverse flow type, so the heavy fraction continues on its way to the outer end of the second cyclone ($P_{18}$) while the light fraction is discharged via a discharge channel 64 provided in flow element 61. Discharge channel 64 is here embodied such that it extends in flow body 61 and then through one or more of the guide fins 62. The part 65 of the discharge channel extending in guide fins 62 is shown in the figures. Discharge channel 64 is provided with an outflow opening 69 along which the separated light fraction leaves cyclone 48.

Figure 13:
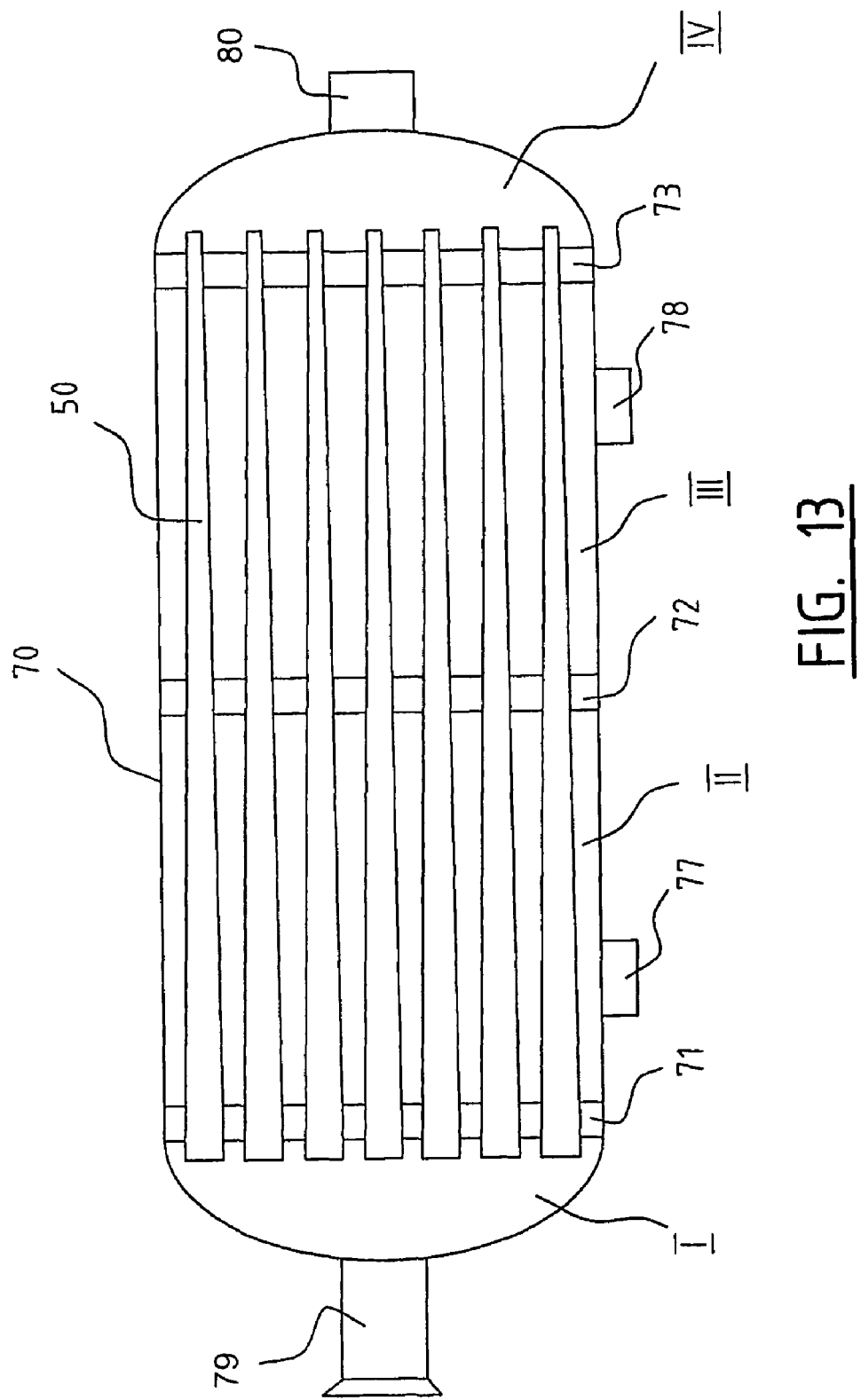
FIG. 13 shows a partially cut-away view in perspective of a separating vessel in which are disposed a number of cyclones according to the preferred embodiment of FIGS. 11-13.

FIG. 13 shows an embodiment of a separating vessel in a configuration similar to that already discussed with reference to FIG. 6A. In this embodiment a number of two-stage cyclones 50 of the type shown in FIGS. 11-12 are arranged in a separating vessel 70. The separating vessel is provided with three walls 71, 72 and 73 which are coupled respectively to coupling parts 74, 75 and 76 of the double cyclone 50. The separating vessel is thus divided into a first compartment I, a second compartment II, a third compartment III and a fourth compartment IV. The mixture for separating is supplied via a mix feed 79. Since the mix is supplied under high pressure, it enters the first compartment I and spreads over the cyclones 50 arranged in separating vessel 70. The separated light fraction (for instance oil) from first cyclone 47 is discharged via outflow opening 59 and enters the second compartment II. The light fraction separated via second cyclone 48 enters the third compartment III via the outflow opening 69 of discharge channel 64. The remaining heavy fraction (for instance water) enters the fourth compartment IV and can there be discharged via an outlet 80. The light fraction in second compartment II and third compartment III is discharged via respective light fraction outlets 77 and 78.

Suppose for instance that a mixture of 20% oil in water is supplied in first compartment I, and a part of the oil is then separated in the first axial flow separating cyclone 47. This part enters second compartment II. The remaining mixture, which now comprises only about 1% oil, is then separated in the second cyclone 48 of the reverse flow type. The separated oil enters third compartment III, while the remaining mixture, which now comprises only about 0.1% oil, enters fourth compartment IV. In practical cases the mixture of heavy fraction with a very small amount of light fraction flowing out via outlet 80 of the fourth compartment IV is also guided through a further external hydrocyclone. In the case of a water/oil separator this means that the finally resulting water has a purity such that it can be drained directly into the surface water without having an environmental impact.

Although the first and second separating cyclone 47,48 have a discharge channel 54,64 with a portion having a decreasing cross-section, embodiments can however also be envisaged in which both discharge channels have another form, for instance a constant (such as cylindrical) cross-section. The embodiment in which one or both discharge channels have a channel portion with a substantially decreasing cross-section is however recommended.

The invention is set forth above on the basis of the description of an example in which the incoming mixture is a mixture of two liquids, i.e. oil and water. It will be apparent to the skilled person that the present invention can also be applied to a random other mixture of one or more liquids or a mixture of one or more gases.

The present invention is not limited to the preferred embodiments thereof described here. The rights sought are rather defined by the following claims, within the scope of which many modifications can be envisaged.

The invention claimed is:

1. A separating cyclone for separating a mixture of liquids and/or gases into a heavy fraction with one or more liquids and/or gases of a relatively high specific mass and a light fraction with one or more liquids and/or gases of a relatively low specific mass, the cyclone comprising:
   a cyclone tube in which a flow space is defined, wherein the cyclone tube is provided with an inlet for infeed of the mixture, a heavy fraction outlet for discharging the heavy fraction separated from the mixture and a light fraction outlet for discharging the light fraction separated from the mixture;
   a rotation generating unit for setting the mixture into rotation;
   a flow body arranged substantially concentrically in the cyclone tube and comprising a light fraction discharge channel connected to the light fraction outlet, the discharge channel comprising a channel portion having a cross-section which decreases in the flow direction;
   a first pressure control element connected to the heavy fraction outlet for adjusting the flow rate of the heavy fraction;
   a second pressure control element connected to the light fraction outlet for adjusting the flow rate of the light fraction; and
   control means configured to control the first and second pressure control elements to cause the interface between the heavy fraction and light fraction to make contact with an inner surface of the discharge channel during use.

2. The separating cyclone as claimed in claim 1, wherein the control means are adapted to cause said interface to make contact with an inner surface of said channel portion during use.

3. The separating cyclone as claimed in claim 1, wherein said channel portion has a cross-section which decreases substantially uniformly in the flow direction.

4. The separating cyclone as claimed in claim 3, wherein said channel portion has a substantially conical form.

5. The separating cyclone as claimed in claim 1, wherein said channel portion has a cross-section decreasing progressively in the flow direction.

6. The separating cyclone as claimed in claim 1, wherein the channel portion has a cross-section decreasing degressively in the flow direction.

7. The separating cyclone as claimed in claim 1, wherein the channel portion is located proximate an inflow opening of the discharge channel.

8. The separating cyclone as claimed in claim 7, wherein the channel portion connects onto the inflow opening of the discharge channel.

9. The separating cyclone as claimed in claim 1, wherein the rotation generating unit comprises one or more guide fins through which the mixture is directed.

10. The separating cyclone as claimed in claim 1, wherein the rotation generating unit comprises a tangential inlet element.

11. The separating cyclone as claimed in claim 1, wherein the rotation generating unit comprises a flow element provided substantially concentrically in the flow space and one or more guide fins arranged between the cyclone tube and the flow element.

12. The separating cyclone as claimed in claim 11, wherein the flow body and the flow element are integrated.

13. The separating cyclone as claimed in claim 11, wherein the flow body is positioned downstream relative to the flow element.

14. The separating cyclone as claimed in claim 13, further comprising an elongate element which is arranged between the flow body and the flow element and which extends concentrically relative to the discharge channel for the purpose of stabilizing the rotating light fraction.

15. The separating cyclone as claimed in claim 14, wherein the elongate element extends into the discharge channel.

16. The separating cyclone as claimed in claim 11, wherein the flow element comprises a substantially conically formed outer end.

17. The separating cyclone as claimed in claim 1, further comprising a passage which is connected to the heavy fraction outlet and is defined between the inner side of the cyclone tube and the outer side of the flow body.

18. The separating cyclone as claimed in claim 17, further comprising one or more rotation reducing units located in the passage for reducing the rotation of the heavy fraction flowing therealong.

19. The separating cyclone as claimed in claim 1, further comprising one or more rotation reducing units located in the discharge channel for reducing rotation of the light fraction flowing therealong.

20. The separating cyclone as claimed in claim 1, wherein the mixture comprises a mixture of oil and water and the separating cyclone operates to separate the mixture into a substantially water-containing heavy fraction and a substantially oil-containing light fraction.

21. The separating cyclone as claimed in claim 1, further comprising a number of guide fins located between the flow body and the cyclone tube, and wherein the discharge channel extends through the flow body and through at least one of the guide fins.

22. The separating cyclone as claimed in claim 1, wherein the separating cyclone comprises two successively coupled separating cyclones, wherein the separated heavy fraction from one separating cyclone is carried into the other separating cyclone for the purpose of further separation into a heavy fraction and a light fraction.

* * * * *